United States Patent
Yang

(10) Patent No.: US 8,567,805 B2
(45) Date of Patent: Oct. 29, 2013

(54) BICYCLE WITH BIDIRECTIONAL INPUT AND ONE-WAY OUTPUT TRANSMISSION COMBINED WITH CRANK HOLE THEREOF

(76) Inventor: Tai-Her Yang, Dzan-Hwa (TW)

(*) Notice: Subject to any disclaimer, the term of this patent is extended or adjusted under 35 U.S.C. 154(b) by 186 days.

(21) Appl. No.: 12/764,162

(22) Filed: Apr. 21, 2010

(65) Prior Publication Data

US 2011/0260426 A1    Oct. 27, 2011

(51) Int. Cl.
*B62M 1/02* (2006.01)
*F16H 3/00* (2006.01)

(52) U.S. Cl.
USPC .......................................... 280/259; 74/810.1

(58) Field of Classification Search
USPC ......... 280/236, 237, 238, 239, 259, 260, 214, 280/215, 255, 212, 230; 74/810.1
See application file for complete search history.

(56) References Cited

U.S. PATENT DOCUMENTS

| 5,918,894 A | * | 7/1999 | Toronto et al. | 280/237 |
| 6,830,259 B2 | * | 12/2004 | Jakovljevic | 280/261 |
| 2010/0109280 A1 | * | 5/2010 | Wills | 280/214 |

* cited by examiner

*Primary Examiner* — Tony H. Winner
*Assistant Examiner* — Jacob Knutson
(74) *Attorney, Agent, or Firm* — Bacon & Thomas, PLLC

(57) ABSTRACT

For the bicycle with bidirectional input and one-way output transmission combined with crank hole thereof of the present invention, the input shaft used for bidirectionally drive of the transmission with bidirectional input and one-way output is installed through and combined with the pedal crank hole of the bicycle frame.

10 Claims, 4 Drawing Sheets

BICYCLE WITH BIDIRECTIONAL INPUT AND ONE-WAY OUTPUT TRANSMISSION COMBINED WITH CRANK HOLE THEREOF

BACKGROUND OF THE INVENTION (a) Field of the Invention

For the bicycle with bidirectional input and one-way output transmission combined with crank hole thereof of the present invention, the input shaft used for bidirectional drive of the transmission with bidirectional input and one-way output is installed through and combined with the pedal crank hole of the bicycle frame to forward or reversely drive the input terminal of the human input device in two rotary directions through human feet, then the output terminal of the human input device transmits the kinetic energy to the input terminal of the transmission with bidirectional input and one-way output, and then through the output terminal of the transmission with bidirectional input and one-way output to produce constant rotary direction output to drive the load wheel group;

The present invention is applied to pedal vehicle, or mixture of electric and pedal vehicles, or combination of electric and pedal vehicles, especially to a bicycle capable of being pedaled bidirectionally and driven to move in unidirectional.

(b) Description of the Prior Art

The rider on the conventional bicycle always pedals at constant direction, and the related muscles and joints are constantly used during the pedaling period, i.e. some muscles and joints of the rider's body are constantly used and stressed, and the others are constantly unused and released, overall, the human load is uneven, the rider is easily fatigued, and exercise injury is caused by frequently pedaling.

SUMMARY OF THE INVENTION

The bicycle with bidirectional input and one-way output transmission combined with crank hole thereof of the present invention is a human input device with dual rotary direction input, in which the output terminal thereof connects to the input terminal of a transmission with bidirectional input and one-way output, the constant rotary direction output through the output terminal of the transmission with bidirectional input and one-way output to drive a load wheel group, and it is characterized in that the input shaft used for bidirectionally drive of the transmission with bidirectional input and one-way output is installed through and combined with the pedal crank hole of the bicycle frame, therefore for the rider making choices of the driving input direction, and producing constant rotary direction output with same or different speed ratio at different driven input direction to drive the load wheel group.

DESCRIPTION OF MAIN COMPONENT SYMBOLS

Figure 1:
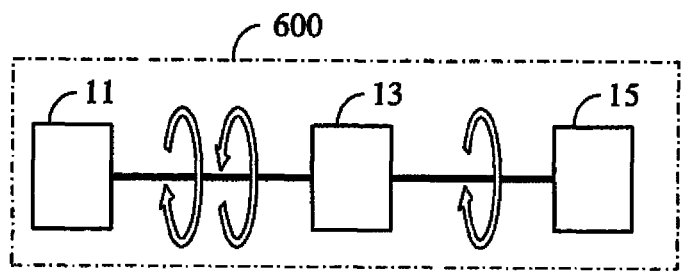
FIG. 1 is a schematic view showing the basic component blocks of the bicycle with bidirectional input and one-way output transmission combined with crank hole thereof, according to the present invention.

11: Human input device
12: Bugtriebwerk
13: Transmission with bidirectional input and one-way output
14: Rear transmission
15: Load wheel group
200: Planetary wheel support arm ring frame
201: Planetary wheel shaft
202: Sun wheel
203: Planetary wheel
204: Outer wheel
301、302、303、305: One-way transmission
400: Epicyclic gear support arm frame
401: Epicyclic gear shaft
402: Inner bevel wheel
403: Epicyclic gear
404: Outer bevel wheel
500: Shell of gear train
600: Machine body
601: Crank Hole
602、603、605、606、615、616、617: Driving wheel
604、618: Revolving shaft
607: Driving belt
608: Helix structure within crank hole
609: Cyclic fix screw structure with hole step
2000: Input shaft
3000: Output shaft

DETAILED DESCRIPTION OF THE PREFERRED EMBODIMENTS

For the bicycle with bidirectional input and one-way output transmission combined with crank hole thereof of the present invention, the input shaft used for bidirectionally drive of the transmission with bidirectional input and one-way output is installed through and combined with the pedal crank hole of the bicycle frame to forward or reversely drive the input terminal of the human input device in two rotary directions through human feet, then the output terminal of the human input device transmits the kinetic energy to the input terminal of the transmission with bidirectional input and one-way output, and then through the output terminal of the transmission with bidirectional input and one-way output to produce constant rotary direction output to drive the load wheel group, and further to drive the vehicle integrated with the load wheel group; the present invention is applied to pedal vehicles, or mixture of electric and pedal vehicles, or combination of electric and pedal vehicles, especially to a bicycle capable of being pedaled bidirectionally and driven to move in unidirectional, for human's lower limbs pedaling bidirectionally to extend and change the muscle groups, thus achieving the following advantages:

(1) reducing the injured caused by some muscles and joints overused; and (2) employing or training the unused muscles and joints.

The bicycle with bidirectional input and one-way output transmission combined with crank hole thereof of the present invention is a human input device with dual rotary direction input, in which the output terminal thereof connects to the input terminal of a transmission with bidirectional input and one-way output, the constant rotary direction output through the output terminal of the transmission with bidirectional input and one-way output to drive a load wheel group, and it is characterized in that the input shaft used for bidirectionally drive of the transmission with bidirectional input and one-way output is installed through and combined with the pedal crank hole of the bicycle frame, therefore for the rider making choices of the driving input direction, and by means of the transmission with bidirectional input and one-way output to produce constant rotary direction output with same or different speed ratio at different driven input direction to further drive the load wheel group.

FIG. 1 is a schematic view showing the basic component blocks of the bicycle with bidirectional input and one-way output transmission combined with crank hole thereof, according to the present invention.

As shown in FIG. 1, which is a structural schematic view of the bicycle with bidirectional input and one-way output transmission combined with crank hole thereof, except for the components of the pedal vehicle and a machine body 600, the main components include:

human input device 11: constituted by an output mechanism with dual rotary direction, which receives forward or reverse rotary driven input or reciprocating driven input from human's foot to produce forward or reverse rotation, including a pedal, a crank, and a driving wheel set with dual rotary direction, or a handle, a hand shank, and a driving wheel set with dual rotary direction, i.e. dual rotary direction mechanism by human power; in which the kinetic energy of the first driving rotary direction and the input kinetic energy of the second driving rotary direction are derived from human's foot for driving the input terminal of the human input device 11;

the first driving rotary direction and the second driving rotary direction are reverse;

transmission with bidirectional input and one-way output 13: which is driven by different rotary direction kinetic energy from the human input device 11, and outputs constant rotary direction kinetic energy; and it is characterized in that the input shaft used for bidirectionally drive of the transmission with bidirectional input and one-way output is installed through and combined with the pedal crank hole of the bicycle frame;

the transmission components within the transmission with bidirectional input and one-way output 13 are constituted by one or more than one kind of the followings, including (1) gear unit; and/or (2) friction wheel group; and/or (3) chain and sprocket section; and/or (4) belt and pulley section; and/or (5) transmission crank and wheels set; and/or (6) fluid transmission unit; and/or (7) electromagnetic force actuator; and in which when the transmission with bidirectional input and one-way output 13 is driven through being input the first driving rotary direction and the second driving rotary direction, which are different rotary directions, the speed ratio between the input terminal and the output terminal with constant rotary direction is the same, different, or variable; in which the main transmission structure and operational features of the transmission with bidirectional input and one-way output 13 are as following:

the first rotary direction and the second rotary direction are reverse;

if the input terminal is driven by the first rotary direction, the first rotary direction output is produced through the first transmission gear train driving the output terminal;

if the input terminal is driven by the second rotary direction, the first rotary direction output is produced through the second transmission gear train driving the output terminal;

an one-way transmission is installed between the first transmission gear train and the second transmission gear train to avoid the interference from the second transmission gear train when the first transmission gear train is used to be the first rotary direction input and produces the first rotary direction output;

an one-way transmission is installed between the second transmission gear train and the first transmission gear train to avoid the interference from the first transmission gear train when the second transmission gear train is used to be the second rotary direction input and produces the first rotary direction output;

load wheel group 15: it is directly driven by the output terminal of the transmission with bidirectional input and one-way output 13, and further drives a vehicle integrated with the load wheel group 15;

For the bicycle with bidirectional input and one-way output transmission combined with crank hole thereof, if it is driven through the human input device 11 by human's foot at the first driving rotary direction, or at the second rotary direction with different rotary direction from the first driving rotary direction, the rotary kinetic energy output from the output terminal of the human input device 11 is transmitted to the input terminal of the transmission with bidirectional input and one-way output 13 via the additionally installed bugtriebwerk 12, and the output terminal of the transmission with bidirectional input and one-way output 13 outputs rotary kinetic energy with constant rotary direction, to drive the load wheel group 15, and to further drive a vehicle integrated with the load wheel group 15.

Figure 2:
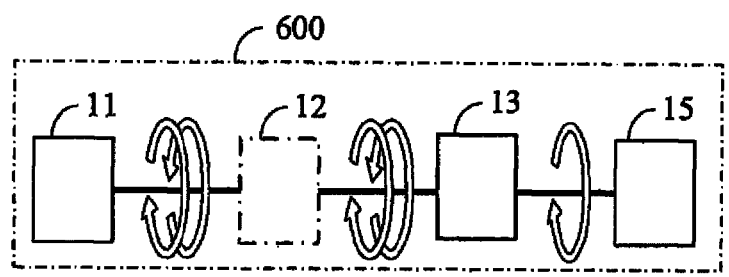
FIG. 2 is a schematic view showing the driving device component blocks, in which a bugtriebwerk 12 is additionally installed between a human input device 11 and a transmission with bidirectional input and one-way output 13 in FIG. 1.

FIG. 2 is a schematic view showing the driving device component blocks, in which the bugtriebwerk 12 is additionally installed between the human input device 11 and the transmission with bidirectional input and one-way output 13 in FIG. 1.

As shown in FIG. 2, for the bicycle with bidirectional input and one-way output, except for the components of the pedal vehicle and a machine body 600, the main components include:

human input device 11: constituted by an output mechanism with dual rotary direction, which receives forward or reverse rotary driven input or reciprocating driven input from human's foot to produce forward or reverse rotation, including a pedal, a crank, and a driving wheel set with dual rotary direction, or a handle, a hand shank, and a driving wheel set with dual rotary direction, i.e. dual rotary direction mechanism by human power; in which the kinetic energy of the first driving rotary direction and the input kinetic energy of the second driving rotary direction are derived from human's foot for driving the input terminal of the human input device 11;

the first driving rotary direction and the second driving rotary direction are reverse;

bugtriebwerk 12: constituted by one or more of the following transmissions including various rotary transmission functional structures, such as gear type, belt type, or friction-type, with constant speed ratio or variable speed ratio; in which the bugtriebwerk 12 is driven by the human input device 11 and outputs rotary kinetic energy for driving the transmission with bidirectional input and one-way output 13;

transmission with bidirectional input and one-way output 13: which is driven by different rotary direction kinetic energy from the bugtriebwerk 12, and outputs constant rotary direction kinetic energy; and it is characterized in that the input shaft used for bidirectionally drive of the transmission with bidirectional input and one-way output is installed through and combined with the pedal crank hole of the bicycle frame;

the transmission components within the transmission with bidirectional input and one-way output 13 are constituted by one or more than one kind of the followings, including (1) gear unit; and/or (2) friction wheel group; and/or (3) chain and sprocket section; and/or (4) belt and pulley section; and/or (5) transmission crank and wheels set; and/or (6) fluid transmission unit; and/or (7) electromagnetic force actuator; and in which when the transmission with bidirectional input and one-way output 13 is driven through being input the first driving rotary direction and the second driving rotary direction, which are different rotary directions, the speed ratio between the input terminal and the output terminal with constant rotary direction is the same, different, or variable; in which the main transmission structure and operational features of the transmission with bidirectional input and one-way output 13 are as following:

the first rotary direction and the second rotary direction are reverse;

if the input terminal is driven by the first rotary direction, the first rotary direction output is produced through the first transmission gear train driving the output terminal;

if the input terminal is driven by the second rotary direction, the first rotary direction output is produced through the second transmission gear train driving the output terminal;

an one-way transmission is installed between the first transmission gear train and the second transmission gear train to avoid the interference from the second transmission gear train when the first transmission gear train is used to be the first rotary direction input and produces the first rotary direction output;

an one-way transmission is installed between the second transmission gear train and the first transmission gear train to avoid the interference from the first transmission gear train when the second transmission gear train is used to be the second rotary direction input and produces the first rotary direction output;

load wheel group 15: it is directly driven by the output terminal of the transmission with bidirectional input and one-way output 13, and further drives a vehicle integrated with the load wheel group 15;

For the bicycle with bidirectional input and one-way output transmission combined with crank hole thereof, the rotary kinetic energy output from the output terminal of the human input device 11, which is forward or reversely driven by human's foot, is transmitted to the transmission with bidirectional input and one-way output 13, and the rotary kinetic energy in constant direction output from the output terminal of the transmission with bidirectional input and one-way output 13 is via the additionally installed rear transmission 14 to drive the load wheel group 15, and to further drive a vehicle integrated with the load wheel group 15.

Figure 3:
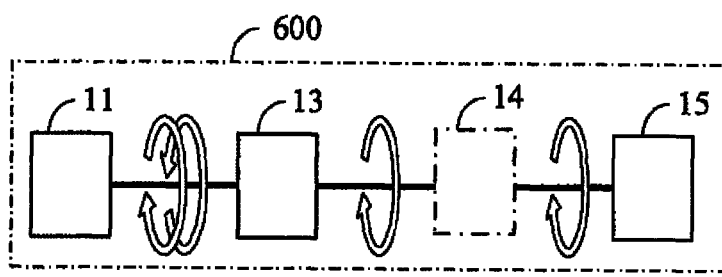
FIG. 3 is a schematic view showing the driving device component blocks, in which a rear transmission 14 is additionally installed between the transmission with bidirectional input and one-way output 13 and a load wheel group 15 in FIG. 1.

FIG. 3 is a schematic view showing the driving device component blocks, in which a rear transmission 14 is additionally installed between the transmission with bidirectional input and one-way output 13 and a load wheel group 15 in FIG. 1.

As shown in FIG. 3, for the bicycle with bidirectional input and one-way output, except for the components of the pedal vehicle and a machine body 600, the main components include:

human input device 11: constituted by an output mechanism with dual rotary direction, which receives forward or reverse rotary driven input or reciprocating driven input from human's foot to produce forward or reverse rotation, including a pedal, a crank, and a driving wheel set with dual rotary direction, or a handle, a hand shank, and a driving wheel set with dual rotary direction, i.e. dual rotary direction mechanism by human power; in which the kinetic energy of the first driving rotary direction and the input kinetic energy of the second driving rotary direction are derived from human's foot for driving the input terminal of the human input device 11;

the first driving rotary direction and the second driving rotary direction are reverse;

transmission with bidirectional input and one-way output 13: which is driven by different rotary direction kinetic energy from the human input device 11 through the bugtriebwerk 12, and outputs constant rotary direction kinetic energy; and it is characterized in that the input shaft used for bidirectionally drive of the transmission with bidirectional input and one-way output is installed through and combined with the pedal crank hole of the bicycle frame;

the transmission components within the transmission with bidirectional input and one-way output 13 are constituted by one or more than one kind of the followings, including (1) gear unit; and/or (2) friction wheel group; and/or (3) chain and sprocket section; and/or (4) belt and pulley section; and/or (5) transmission crank and wheels set; and/or (6) fluid transmission unit; and/or (7) electromagnetic force actuator; and in which when the transmission with bidirectional input and one-way output 13 is driven through being input the first driving rotary direction and the second driving rotary direction, which are different rotary directions, the speed ratio between the input terminal and the output terminal with constant rotary direction is the same, different, or variable; in which the main transmission structure and operational features of the transmission with bidirectional input and one-way output 13 are as following:

the first rotary direction and the second rotary direction are reverse;

if the input terminal is driven by the first rotary direction, the first rotary direction output is produced through the first transmission gear train driving the output terminal;

if the input terminal is driven by the second rotary direction, the first rotary direction output is produced through the second transmission gear train driving the output terminal;

an one-way transmission is installed between the first transmission gear train and the second transmission gear train to avoid the interference from the second transmission gear train when the first transmission gear train is used to be the first rotary direction input and produces the first rotary direction output;

an one-way transmission is installed between the second transmission gear train and the first transmission gear train to avoid the interference from the first transmission gear train when the second transmission gear train is used to be the second rotary direction input and produces the first rotary direction output;

rear transmission 14: constituted by one or more than one kind of the following transmissions including various rotary transmission functional structures, such as gear type, belt type, or friction-type, with constant speed ratio or variable speed ratio, for being driven by the transmission with bidirectional input and one-way output 13, whereas its output terminal is used to drive the load wheel group 15; and load wheel group 15: directly driven by the output terminal of the rear transmission 14, and further driving a vehicle integrated with the load wheel group 15; in which for the bicycle with bidirectional input and one-way output transmission combined with crank hole thereof, it drives the human input device 11 through forward or reverse rotation by human's foot, so as the rotary kinetic energy is output from the output terminal, and is via the additionally installed bugtriebwerk 12 transmitted to the input terminal of the transmission with bidirectional input and one-way output 13, and then is output in constant rotary direction from the output terminal of the transmission with bidirectional input and one-way output 13 to drive the load wheel group 15 through the additionally installed rear transmission 14, and to further drive a vehicle integrated with the load wheel group 15.

Figure 4:
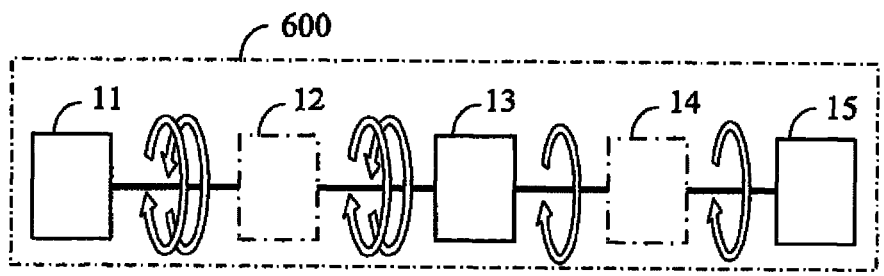
FIG. 4 is a schematic view showing the driving device component blocks, in which the bugtriebwerk 12 is additionally installed between the human input device 11 and the transmission with bidirectional input and one-way output 13, and the rear transmission 14 is additionally installed between the transmission with bidirectional input and one-way output 13 and the load wheel group 15 in FIG. 1.

FIG. 4 is a schematic view showing the driving device component blocks, in which the bugtriebwerk 12 is additionally installed between the human input device 11 and the transmission with bidirectional input and one-way output 13, and the rear transmission 14 is additionally installed between the transmission with bidirectional input and one-way output 13 and the load wheel group 15 in FIG. 1.

As shown in FIG. 4, for the bicycle with bidirectional input and one-way output, except for the components of the pedal vehicle and a machine body 600, the main components include:

human input device 11: constituted by an output mechanism with dual rotary direction, which receives forward or reverse rotary driven input or reciprocating driven input from human's foot to produce forward or reverse rotation, including a pedal, a crank, and a driving wheel set with dual rotary direction, or a handle, a hand shank, and a driving wheel set with dual rotary direction, i.e. dual rotary direction mechanism by human power; in which the kinetic energy of the first driving rotary direction and the input kinetic energy of the second driving rotary direction are derived from human's foot for driving the input terminal of the human input device 11;

the first driving rotary direction and the second driving rotary direction are reverse;

bugtriebwerk 12: constituted by one or more than one kind of the following transmissions including various rotary transmission functional structures, such as gear type, belt type, or friction-type, with constant speed ratio or variable speed ratio; in which the bugtriebwerk 12 is driven by the human input device 11 and outputs rotary kinetic energy for driving the transmission with bidirectional input and one-way output 13;

transmission with bidirectional input and one-way output 13: which is driven by different rotary direction kinetic energy from the bugtriebwerk 12, and outputs constant rotary direction kinetic energy; and it is characterized in that the input shaft used for bidirectionally drive of the transmission with bidirectional input and one-way output is installed through and combined with the pedal crank hole of the bicycle frame;

the transmission components within the transmission with bidirectional input and one-way output 13 are constituted by one or more than one kind of the followings, including (1) gear unit; and/or (2) friction wheel group; and/or (3) chain and sprocket section; and/or (4) belt and pulley section; and/or (5) transmission crank and wheels set; and/or (6) fluid transmission unit; and/or (7) electromagnetic force actuator; and in which when the transmission with bidirectional input and one-way output 13 is driven through being input the first driving rotary direction and the second driving rotary direction, which are different rotary directions, the speed ratio between the input terminal and the output terminal with constant rotary direction is the same, different, or variable; in which the main transmission structure and operational features of the transmission with bidirectional input and one-way output 13 are as following:

the first rotary direction and the second rotary direction are reverse;

if the input terminal is driven by the first rotary direction, the first rotary direction output is produced through the first transmission gear train driving the output terminal;

if the input terminal is driven by the second rotary direction, the first rotary direction output is produced through the second transmission gear train driving the output terminal;

an one-way transmission is installed between the first transmission gear train and the second transmission gear train to avoid the interference from the second transmission gear train when the first transmission gear train is used to be the first rotary direction input and produces the first rotary direction output;

an one-way transmission is installed between the second transmission gear train and the first transmission gear train to avoid the interference from the first transmission gear train when the second transmission gear train is used to be the second rotary direction input and produces the first rotary direction output;

rear transmission 14: constituted by one or more than one kind of the following transmissions including various rotary transmission functional structures, such as gear type, belt type, or friction-type, with constant speed ratio or variable speed ratio, for being driven by the transmission with bidirectional input and one-way output 13, whereas its the output terminal is used to drive the load wheel group 15; and load wheel group 15: directly driven by the output terminal of the rear transmission 14, and further driving a vehicle integrated with the load wheel group 15.

For the bicycle with bidirectional input and one-way output transmission combined with crank hole thereof, except for the related components, machine body and the load wheel set of the driven vehicle installed, it is characterized by capable of performing two-way intput and one-way output, and the components and operational features of the transmission with bidirectional input and one-way output 13 are provided for describing the feasibility.

Figure 5:
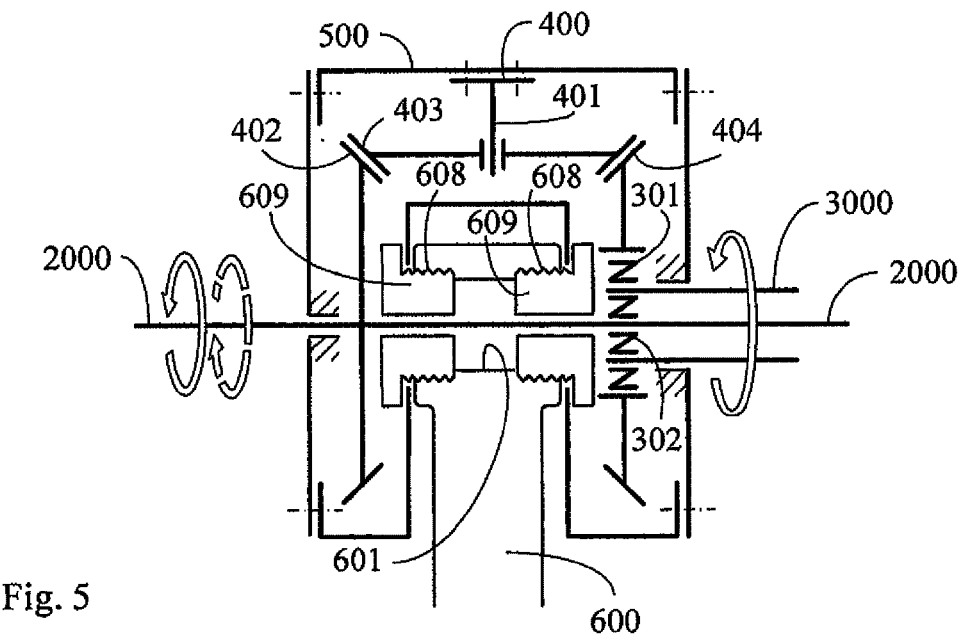
FIG. 5 is a structural schematic view showing the first embodiment of the transmission with bidirectional input and one-way output 13 combined with the crank hole thereof, according to the present invention.

The installed transmission with bidirectional input and one-way output 13 in the bicycle with bidirectional input and one-way output transmission combined with crank hole thereof, whose operational features are as following:

the first rotary direction and the second rotary direction are reverse;

if the input terminal is driven by the first rotary direction, the first rotary direction output is produced through the first transmission gear train driving the output terminal;

if the input terminal is driven by the second rotary direction, the first rotary direction output is produced through the second transmission gear train driving the output terminal;

an one-way transmission is installed between the first transmission gear train and the second transmission gear train to avoid the interference from the second transmission gear train when the first transmission gear train is used to be the first rotary direction input and produces the first rotary direction output;

an one-way transmission is installed between the second transmission gear train and the first transmission gear train to avoid the interference from the first transmission gear train when the second transmission gear train is used to be the second rotary direction input and produces the first rotary direction output;

In the bicycle with bidirectional input and one-way output transmission combined with crank hole thereof, the embodiments of the transmission with bidirectional input and one-way output 13 combined with crank hole thereof used are shown as FIGS. 5 to 9, including:

A) as shown in FIG. 5, which is constituted by an epicyclic gear train combined with crank hole thereof; and B) as shown in FIGS. 6 to 9, which is integrated constituted by a transmission with different transmission rotary direction combined with crank hole thereof.

FIG. 5 is a structural schematic view showing the first embodiment of the transmission with bidirectional input and one-way output 13 combined with the crank hole thereof, according to the present invention.

Figure 6:
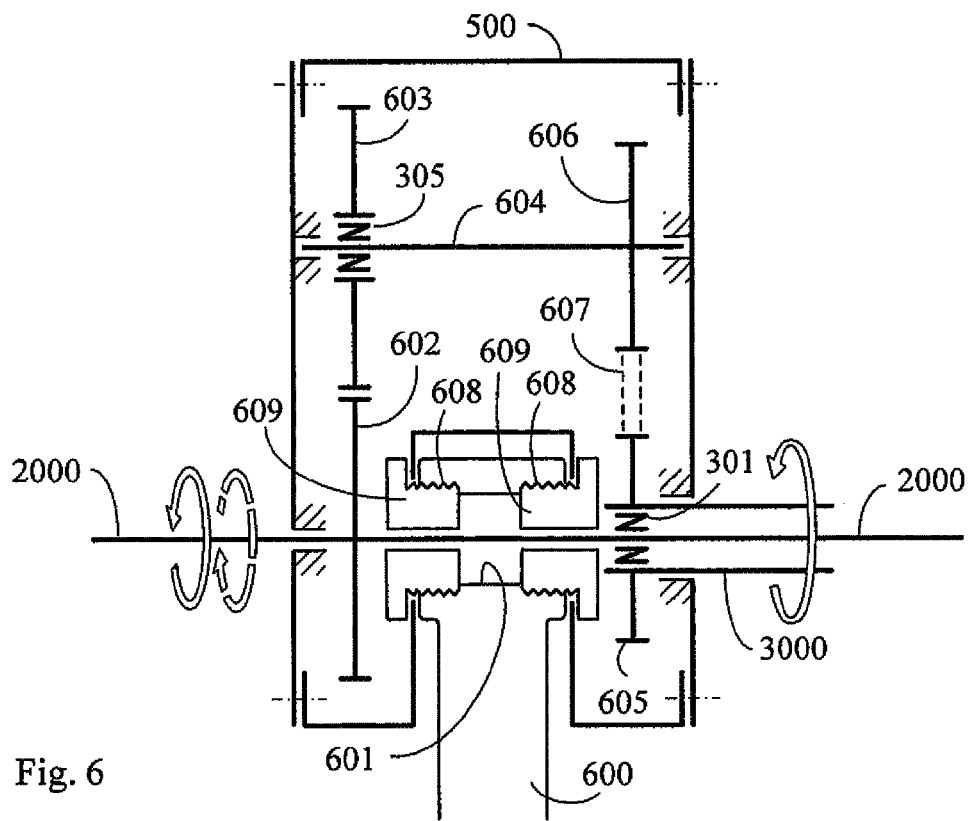
FIG. 6 is a structural schematic view showing the second embodiment of the transmission with bidirectional input and one-way output 13 combined with the crank hole thereof, according to the present invention.

As shown in FIG. 5, the transmission with bidirectional input and one-way output 13 in FIGS. 1 to 4 is constituted by an epicyclic gear train, in which the input shaft and output shaft are coaxially fitting, and the main components include:

one end of the input shaft 2000 of the transmission with bidirectional input and one-way output 13 is through installed at one outside of the shell of the gear train 500 in concave structure via a bearing structure, then via two concave inner shells of the concave structure, and from the other end of the input shaft 2000 to perforate through the output shaft 3000 via the one-way transmission 302, and a bearing is installed between the output shaft 3000 and the other outside of the shell of gear train 500;

shell of gear train 500: related to a concave structure, which is installed to constitute the mechanical part of the gear train with bidirectional input and one-way output, and through the cyclic fix screw structure with hole step 609 to be locked in the helix structure within crank hole 608 of the crank hole 601, which is embedded in the indentation space of the concave structure;

machine body 600: a relatively static mechanism structure;

input shaft 2000 is integrated at the inner bevel wheel 402;

an epicyclic gear 403 is installed between the outer bevel wheel 404 and the inner bevel wheel 402; the center of the epicyclic gear 403 rotates at an epicyclic gear shaft 401; one end of the epicyclic gear shaft 401 is integrated at an epicyclic gear support arm frame 400, and the epicyclic gear support arm frame 400 is fixed at the shell of gear train 500;

the shell of gear train 500 is by means of the cyclic fix screw structure with hole step 609 installed within the helix structure within crank hole 608 of the crank hole 601 of the machine body 600;

the one-way transmission 301 is installed between the outer bevel wheel 404 and the output shaft 3000;

the inner bevel wheel 402, the epicyclic gear 403, and the outer bevel wheel 404 are constituted by gears or friction wheels;

the relation of the transmission ratio for the inner bevel wheel 402 to drive the epicyclic gear 403 is acceleration, deceleration, or constant velocity;

the relation of the transmission ratio for the epicyclic gear 403 to drive the outer bevel wheel 404 is acceleration, deceleration, or constant velocity;

by way of the above structure, the input shaft 2000 is driven at the first rotary direction, and is through the one-way transmission 302 for driving the output shaft 3000 to produce the first rotary direction output, therefore to constitute the first transmission gear train;

by way of the above structure, the input shaft 2000 is driven at the second rotary direction, through the inner bevel wheel 402 for further driving the epicyclic gear 403 and the outer bevel wheel 404, and through the outer bevel wheel 404 and the one-way transmission 301 for driving the output shaft 3000 to produce the first rotary direction output, therefore to constitute the second transmission gear train; and FIG. 6 is a structural schematic view showing the second embodiment of the transmission with bidirectional input and one-way output 13 combined with the crank hole thereof, according to the present invention;

As shown in FIG. 6, the transmission with bidirectional input and one-way output 13 in FIGS. 1 to 4 is integrated and constituted by a transmission with different transmission rotary directions, in which the input shaft and output shaft are coaxially fitting, and the main components include:

one end of the input shaft 2000 of the transmission with bidirectional input and one-way output 13 is through installed at one outside of the shell of the gear train 500 in concave structure via a bearing structure, then via two concave inner shells of the concave structure, and from the other end of the input shaft 2000 to perforate through the output shaft 3000 via the one-way transmission 301, and a bearing is installed between the output shaft 3000 and the other outside of the shell of gear train 500;

shell of gear train 500: related to a concave structure, which is installed to constitute the mechanical part of the gear train with bidirectional input and one-way output, and through the cyclic fix screw structure with hole step 609 to be locked in the helix structure within crank hole 608 of the crank hole 601, which is embedded in the indentation space of the concave structure;

machine body 600: a relatively static mechanism structure;

the other end of the input shaft 2000 is integrated with the driving wheel 602;

the driving wheel 602 and the driving wheel 603 rotates in different directions, the driving wheel 603 is via the one-way transmission 305 and then is common with the driving wheel 606 integrated at the revolving shaft 604, and a bearing is installed between the revolving shaft 604 and the shell of gear train 500;

the driving wheel 606 and the driving wheel 605 are by means of the pulley or sprocket, driven by the driving belt 607, to constitute a driving wheel set with the same rotary direction;

the driving wheel 605 is integrated with the output shaft 3000;

the shell of the gear train 500 is by means of the cyclic fix screw structure with hole step 609 installed within the helix structure within the crank hole 608 of the crank hole 601 of the machine body 600;

the driving wheels 602, 603 are constituted by gears, or friction wheels;

the relation of the transmission ratio in the driving wheel set with different rotary directions is acceleration, deceleration, or constant velocity;

the relation of the transmission ratio in the driving wheel set with same rotary direction is acceleration, deceleration, or constant velocity;

the driving wheel set with same rotary direction is constituted by the pulley with driving belt, toothed belt or steel belt, or the sprocket with chain;

by way of the above structure, the input shaft 2000 is driven at the first rotary direction, and is through the one-way transmission 301 for driving the output shaft 3000 to produce the first rotary direction output, therefore to constitute the first transmission gear train; and by way of the above structure, the input shaft 2000 is driven at the second rotary direction to drive the driving wheel 602, then the driving wheel 602 drives the driving wheel 603, then the driving wheel 603 drives the driving wheel 604 via the one-way transmission 305 to drive the driving wheel 606, and then the driving wheel 606 drives the driving wheel 605 for driving the output shaft 3000 to produce the first rotary direction output, therefore to constitute the second transmission gear train.

Figure 7:
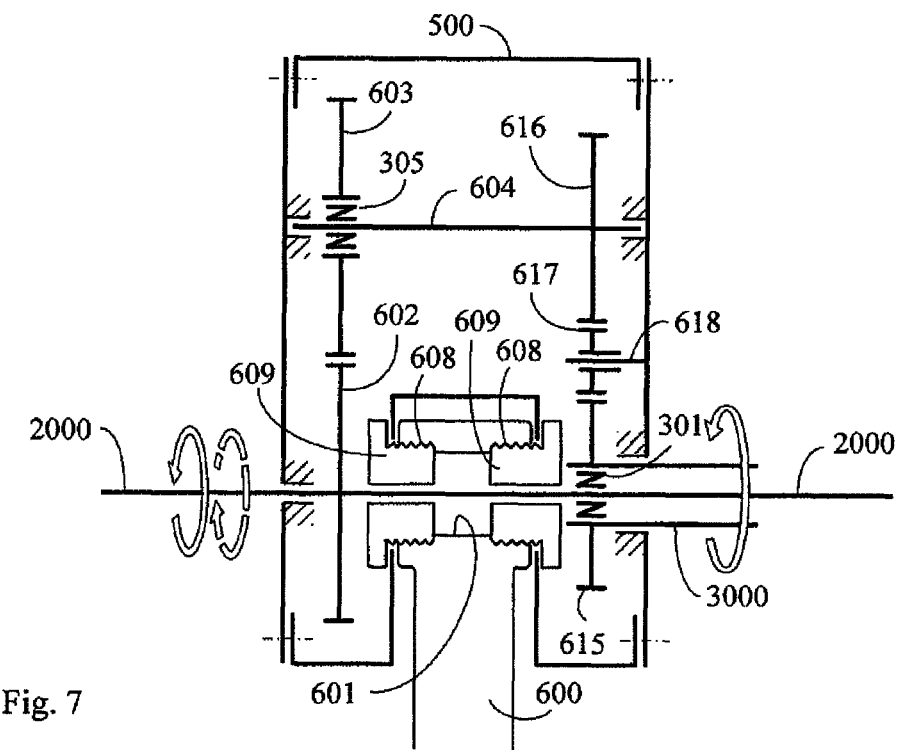
FIG. 7 is a structural schematic view showing the third embodiment of the transmission with bidirectional input and one-way output 13 combined with the crank hole thereof, according to the present invention.

FIG. 7 is a structural schematic view showing the third embodiment of the transmission with bidirectional input and one-way output 13 combined with the crank hole thereof, according to the present invention.

As shown in FIG. 7, the transmission with bidirectional input and one-way output 13 in FIGS. 1 to 4 is integrated and constituted by a transmission with different rotary directions, in which the input shaft and output shaft are coaxially fitting, and the main components include:

one end of the input shaft 2000 of the transmission with bidirectional input and one-way output 13 is through installed at one outside of the shell of the gear train 500 in concave structure via a bearing structure, then via two concave inner shells of the concave structure, and from the other end of the input shaft 2000 to perforate through the output shaft 3000 via the one-way transmission 301, and a bearing is installed between the output shaft 3000 and the other outside of the shell of gear train 500;

shell of gear train 500: related to a concave structure, which is installed to constitute the mechanical part of the gear train with bidirectional input and one-way output, and through the cyclic fix screw structure with hole step 609 to be locked in the helix structure within crank hole 608 of the crank hole 601, which is embedded in the indentation space of the concave structure;

machine body 600: a relatively static mechanism structure;

the input shaft 2000 is integrated with the driving wheel 602;

the driving wheel 602 and the driving wheel 603 rotates in different directions, the driving wheel 603 is via the one-way transmission 305 and then is common with the driving wheel 616 integrated at the revolving shaft 604, and a bearing is installed between the revolving shaft 604 and the shell of gear train 500;

the driving wheel 616 drives the driving wheel 615 via the driving wheel 617 rotating at the revolving shaft 618 to constitute a driving wheel set with same rotary direction;

the revolving shaft 618 is integrated at the shell of gear train 500;

the driving wheel 615 is integrated with the output shaft 3000;

the shell of the gear train 500 is by means of the cyclic fix screw structure with hole step 609 installed within the helix structure within crank hole 608 of the crank hole 601 of the machine body 600;

the driving wheels 602, 603, 615, 616, and 617 are constituted by gears, or friction wheels;

the relation of the transmission ratio in the driving wheel set with different rotary directions is acceleration, deceleration, or constant velocity;

the relation of the transmission ratio in the driving wheel set with same rotary direction is acceleration, deceleration, or constant velocity;

the driving wheel set with same rotary direction is constituted by the gear set containing the idle gear or by the internal gear set;

by way of the above structure, the input shaft 2000 is driven at the first rotary direction, and is through the one-way transmission 301 for driving the output shaft 3000 to produce the first rotary direction output, therefore to constitute the first transmission gear train;

by way of the above structure, the input shaft 2000 is driven at the second rotary direction to drive the driving wheel 602, then the driving wheel 602 drives the driving wheel 603, then the driving wheel 603 drives the driving wheel 604 via the one-way transmission 305 to drive the driving wheel 616, then the driving wheel 616 via the driving wheel 617 drives the driving wheel 615, and then the driving wheel 615 drives the output shaft 3000 to produce the first rotary direction output to constitute the second transmission gear train.

Figure 8:
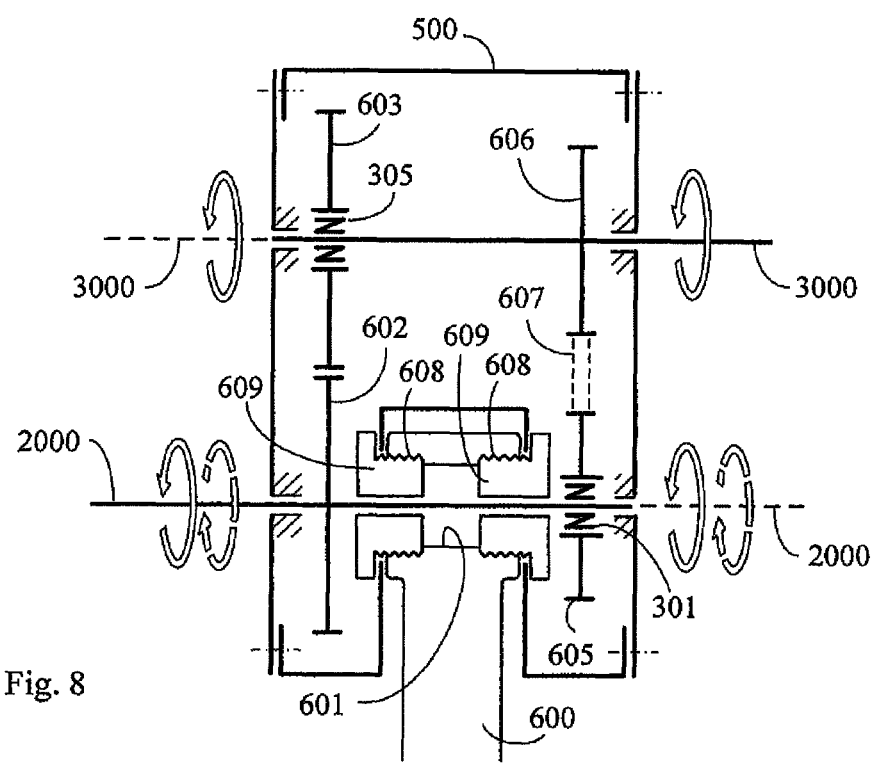
FIG. 8 is a structural schematic view showing the fourth embodiment of the transmission with bidirectional input and one-way output 13 combined with the crank hole thereof, according to the present invention.

FIG. 8 is a structural schematic view showing the fourth embodiment of the transmission with bidirectional input and one-way output 13 combined with the crank hole thereof, according to the present invention.

As shown in FIG. 8, the transmission with bidirectional input and one-way output 13 in FIGS. 1 to 4 is integrated and constituted by a transmission with different rotary directions, in which the input shaft and output shaft are installed in different axis, and the main components include:

one end of the input shaft 2000 of the transmission with bidirectional input and one-way output 13 is through installed at one outside of the shell of gear train 500 in concave structure via a bearing structure, then via two concave inner shells of the concave structure, and from the other end of the input shaft 2000 to perforate through the driving wheel 605 via the one-way transmission 301, a bearing is installed between the other end of the input shaft 2000 and the other outside of the shell of gear train 500, and the rotary power source is inputted through one or two ends of the input shaft 2000;

shell of gear train 500: related to a concave structure, which is installed to constitute the mechanical part of the gear train with bidirectional input and one-way output, and through the cyclic fix screw structure with hole step 609 to be locked in the helix structure within crank hole 608 of the crank hole 601, which is embedded in the indentation space of the concave structure;

machine body 600: a relatively static mechanism structure;

the input shaft 2000 is integrated with the driving wheel 602;

the driving wheel 602 and the driving wheel 603 rotates in different directions, the driving wheel 603 is via the one-way transmission 305 to integrate at the output shaft 3000, the driving wheel 606 is integrated at the output shaft 3000, and a bearing is installed between the output shaft 3000 and the shell of gear train 500;

the driving wheel 605 and the driving wheel 606 are by means of the pulley or sprocket, driven by the driving belt 607, to constitute a driving wheel group with same rotary direction;

the driving wheel 606 is integrated with the output shaft 3000;

the shell of the gear train 500 is by means of the cyclic fix screw structure with hole step 609 installed within the helix structure within crank hole 608 of the crank hole 601 of the machine body 600;

the driving wheels 602, 603 are constituted by gears, or friction wheels;

the relation of the transmission ratio in the driving wheel set with different rotary directions is acceleration, deceleration, or constant velocity;

the relation of the transmission ratio in the driving wheel set with same rotary direction is acceleration, deceleration, or constant velocity;

the driving wheel set with same rotary direction is constituted by the pulley with driving belt, toothed belt or steel belt, or by the sprocket with chain;

by way of the above structure, the input shaft 2000 is driven at the first rotary direction, and is through the one-way transmission 301 for driving the driving wheel 605, through the driving wheel 607 for driving the driving wheel 606 to further drive the output shaft 3000 to produce the first rotary direction output, therefore to constitute the first transmission gear train;

by way of the above structure, the input shaft 2000 is driven at the second rotary direction to drive the driving wheel 602, then the driving wheel 602 drives the driving wheel 603, and then via the one-way transmission 305 for driving the output shaft 3000 to produce the first rotary direction output, therefore to constitute the second transmission gear train; and one or two ends of the output shaft 3000 is arranged to output.

Figure 9:
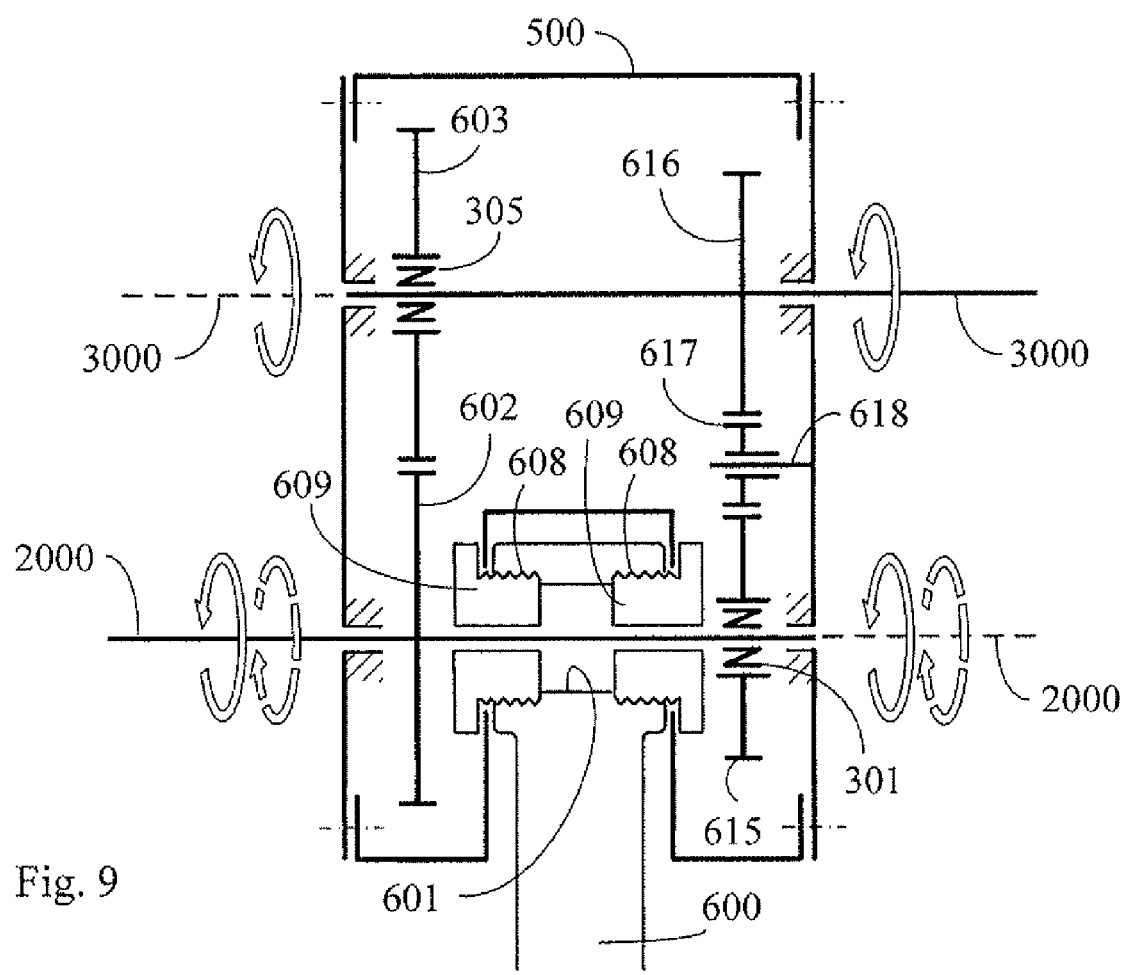
FIG. 9 is a structural schematic view showing the fifth embodiment of the transmission with bidirectional input and one-way output 13 combined with the crank hole thereof, according to the present invention.

FIG. 9 is a structural schematic view showing the fifth embodiment of the transmission with bidirectional input and one-way output 13 combined with the crank hole thereof, according to the present invention.

As shown in FIG. 9, the transmission with bidirectional input and one-way output 13 in FIGS. 1 to 4 is integrated and constituted by a transmission with different rotary directions, in which the input shaft and output shaft are installed in different axis, and the main components include:

one end of the input shaft 2000 of the transmission with bidirectional input and one-way output 13 is through installed at one outside of the shell of gear train 500 in concave structure via a bearing structure, then via two concave inner shells of the concave structure, and from the other end of the input shaft 2000 to perforate through the driving wheel 615 via the one-way transmission 301, a bearing is installed between the other end of the input shaft 2000 and the other outside of the shell of gear train 500, and the rotary power source is inputted through one or two ends of the input shaft 2000;

shell of gear train 500: related to a concave structure, which is installed to constitute the mechanical part of the gear train with bidirectional input and one-way output, and through the cyclic fix screw structure with hole step 609 to be locked in the helix structure within crank hole 608 of the crank hole 601, which is embedded in the indentation space of the concave structure;

machine body 600: a relatively static mechanism structure;

the input shaft 2000 is integrated with the driving wheel 602, the driving wheel 615 drives the driving wheel 616 via the driving wheel 617, the driving wheel 616 is integrated with the output shaft 3000, and a bearing is installed between the output shaft 3000 and the shell of gear train 500;

the driving wheel 617 rotates at the revolving shaft 618, and the revolving shaft 618 is installed at the shell of gear train 500;

the driving wheel 602 and the driving wheel 603 rotate in different directions;

the driving wheel 603 is integrated with the output shaft 3000 through the one-way transmission 305;

the shell of the gear train 500 is by means of the cyclic fix screw structure with hole step 609 installed within the helix structure within crank hole 608 of the crank hole 601 of the machine body 600;

the driving wheels 602, 603, 615, 616, and 617 are constituted by gears, or friction wheels;

the relation of the transmission ratio in the driving wheel set with different rotary directions is acceleration, deceleration, or constant velocity;

the relation of the transmission ratio in the driving wheel set with same rotary direction is acceleration, deceleration, or constant velocity;

the driving wheel set with same rotary direction is constituted by the gear set containing the idle gear or by the internal gear set;

by way of the above structure, the input shaft 2000 is driven at the first rotary direction, and is through the one-way transmission 301 for driving the driving wheel 615, then through the driving wheel 617 for driving the driving wheel 616 and for further driving the output shaft 3000 to produce the first rotary direction output, therefore to constitute the first transmission gear train;

by way of the above structure, the input shaft 2000 is driven at the second rotary direction to drive the driving wheel 602, then the driving wheel 602 drives the driving wheel 603, then the driving wheel 603 through the one-way transmission 305 drives the output shaft 3000 to produce the first rotary direction output, therefore to constitute the second transmission gear train; and one or two ends of the output shaft 3000 is arranged to output.

In the bicycle with bidirectional input and one-way output transmission combined with crank hole thereof, as for the installed position of the one-way transmission in the transmission with bidirectional input and one-way output 13, except for the structural positions exampled in FIGS. 5 to 9, the installed position can be selected under the same operational function of one-way input and bidirectional output.

In the bicycle with bidirectional input and one-way output transmission combined with crank hole thereof, as for the combining methods of the transmission with bidirectional input and one-way output 13 and the crank hole 601 of the bicycle, except for the cyclic fix screw structure with hole step 609 and the helix structure within crank hole 608 locked in the crank hole 601, further including fastening through latch structure, and/or combining through key and keyway structure, and/or combining through pin and pin hole, and/or screwing through helical structure, and/or clamping or welding through clamping structure, to install the transmission with bidirectional input and one-way output 13 at the crank hole 601.

The invention claimed is:

1. A bicycle having a transmission (13) with a bidirectional input and a one-way output, said transmission combined with a crank hole of a frame of the bicycle, comprising:
   a load wheel set (15) connected to an output terminal of the transmission to cause motion of the bicycle;
   a human input device (11) connected to an input terminal of the transmission for receiving a dual rotary direction input from a person and supplying a dual rotary direction input to the transmission, wherein the human input device includes a pedal, a crank, and a driving wheel set, or a handle, a hand shank, and a driving wheel set, and wherein said crank or hand shank extends through a crank hole structure (609) including said crank hole (601),
   wherein the transmission (13) is installed through, and combined with, said crank hole structure (609) and crank hole (601), said transmission having a threaded portion (608) that extends into the crank hole and is secured to the crank hole structure (609),
   wherein said transmission (13) includes a first transmission gear train for receiving a first direction rotary input from the human input device (11) via an input shaft (2000) and for providing a first direction rotary output to the load wheel set (15), and a second transmission gear train for receiving a second direction rotary input from the human input device (11) via the input shaft (2000) and for also providing said first direction rotary output to the load wheel set (15), said first and second direction rotary inputs being in opposite directions,
   wherein said first transmission gear train includes a first one-way transmission device (301) to transmit power without interference from the second gear train when the first transmission gear train receives the first direction rotary input from the human input device and provides the first direction rotary output, and said second transmission gear train includes a second one-way transmission device (302 or 305) to transmit power without interference from the first gear train when the second gear train receives the second direction rotary input from the human input device and provides the first direction rotary output, and
   wherein said input shaft (2000) extends through the crank hole (601) and said first and second transmission gear trains include at least one transmission component on a first side of said crank hole structure (609) and at least one transmission component on a second side of said crank hole structure (609).

2. A bicycle having a transmission with a bidirectional input and a one-way output as claimed in claim 1, wherein said first and second gear trains of the transmission (13) include components constituted by at least one of a gear set, a friction wheel set, a chain and sprocket section, a belt and pulley section, a transmission crank and wheel set, a fluid transmission unit, and an electromagnetic force actuator.

3. A bicycle having a transmission with a bidirectional input and a one-way output as claimed in claim 1, further comprising a rear transmission device (14) connected between the transmission (13) and the load wheel set (15) for supplying said first direction rotary output to said load wheel set, said rear transmission including at least one gear, belt, or friction device to provide one of a constant speed ratio output or a variable speed ratio output.

4. A bicycle having a transmission with a bidirectional input and a one-way output, said transmission combined with a crank hole of a frame of the bicycle, comprising:
   a load wheel set (15) connected to an output terminal of the transmission to cause motion of the bicycle;
   a human input device (11) connected to an input terminal of the transmission for receiving a dual rotary direction input from a person and supplying a dual rotary direction input to the transmission, wherein the human input device includes a pedal, a crank, and a driving wheel set, or a handle, a hand shank, and a driving wheel set, and wherein said crank or hand shank extends through a crank hole structure (609) including said crank hole (601),
   wherein the transmission (13) is installed through, and combined with, said crank hole structure (609) and crank hole (601), said transmission having a threaded portion (608) that extends into the crank hole and is secured to the crank hole structure (609),
   wherein said transmission (13) includes a first transmission gear train for receiving a first direction rotary input from the human input device (11) and for providing a first direction rotary output to the load wheel set (15), and a second transmission gear train for receiving a second direction rotary input from the human input device (11) and for also providing said first direction rotary output to the load wheel set (15), said first and second direction rotary inputs being in opposite directions,
   wherein said first transmission gear train includes a first one-way transmission device (301) to transmit power without interference from the second gear train when the first transmission gear train receives the first direction rotary input from the human input device and provides the first direction rotary output, and said second transmission gear train includes a second one-way transmission device (302 or 305) to transmit power without interference from the first gear train when the second gear train receives the second direction rotary input from the human input device and provides the first direction rotary output, and
   wherein a gear train shell (500) is installed on the crank hole structure 609 which is threaded into an end section (608) of the crank hole (601), said crank hole (601) being formed in a frame structure (600) of the bicycle, and said gear train shell (500) being a hollow structure for housing components of the transmission (13).

5. A bicycle having a transmission with a bidirectional input and a one-way output as claimed in claim 4, wherein the components of the transmission (13) include:
   an input shaft (2000), a first end of which extends through and is rotatably mounted to a first side of the gear train shell (500) and a second end of which extends into as is connected to a cylindrical output shaft (3000) via the second one-way transmission (302), said cylindrical output shaft (3000) being rotatably mounted to extend through a second side of the gear train shell (500);
   an inner bevel wheel (402) integrated with the input shaft (2000);
   an epicyclic gear (403) installed between an outer bevel wheel (404) and the inner bevel wheel (402), a center of the epicyclic gear (403) rotatably mounted on an epicyclic gear shaft (401) having one end mounted in an epicyclic gear support arm frame (400) fixed to the gear train shell (500); and
   the first one-way transmission (301, which is installed between the outer bevel wheel (404) and the output shaft (3000), and wherein:

the inner bevel wheel (402), the epicyclic gear (403), and the outer bevel wheel (404) are constituted by gears or friction wheels, the first transmission gear train includes the input shaft (2000) driven by the first direction rotary input and the one-way transmission (302) for driving the output shaft (3000) to provide the first direction rotary output, and the second transmission gear train including the input shaft (2000) driven by the second direction rotary input, the inner bevel wheel (402) driven by the input shaft, the epicyclic gear (403) driven by the inner bevel wheel (402), and the outer bevel wheel (404) driven by the epicyclic gear (403), and the one-way transmission (301) driven by the outer bevel wheel (404) to drive the output shaft (3000) to provide the first direction rotary output.

6. A bicycle having a transmission with a bidirectional input and a one-way output as claimed in claim 4, wherein the components of the transmission (13) include:

an input shaft (2000), a first end of which extends through and is rotatably mounted to a first side of the gear train shell (500) and a second end of which extends into as is connected to a cylindrical output shaft (3000) via the first one-way transmission (301), said cylindrical output shaft (3000) being rotatably mounted to extend through a second side of the gear train shell (500);

a driving wheel (602) integrated with the first end of the input shaft (2000);

a driving wheel (603) that is rotated by the driving wheel (602) in a direction opposite to that of the driving wheel (602);

a driving wheel (606) integrated with a revolving shaft (604) rotatably mounted to the gear train shell (500) and connected with the driving wheel (603) through the one-way transmission (305);

a driving wheel (605) integrated with the output shaft (3000) and coupled to the driving wheel (606) by a pulley and driving belt (607) or sprocket and chain (607) to drive the driving wheel (605) in a same direction as the driving wheel (606), and wherein:

the driving gears (602, 603) are constituted by gears or friction wheels, the first transmission gear train includes the input shaft (2000) driven by the first direction rotary input through the first one-way transmission (301) for driving the driving wheel (605) and through the driving belt (607) or the sprocket and chain (607) and the driving wheel (606) for driving the output shaft (3000) to provide the first direction rotary output, and the second transmission gear train including the input shaft (2000) driven by the second direction rotary input, the driving wheel (602) driven by the input shaft (2000), the driving wheel (603) driven by the driving wheel (602) through the one-way transmission (305) to drive and rotate the output shaft (3000) and provide said first direction rotary output.

7. A bicycle having a transmission with a bidirectional input and a one-way output as claimed in claim 4, wherein the components of the transmission (13) include:

an input shaft (2000), a first end of which extends through and is rotatably mounted to a first side of the gear train shell (500) and a second end of which extends into as is connected to a cylindrical output shaft (3000) via the first one-way transmission (301), said cylindrical output shaft (3000) being rotatably mounted to extend through a second side of the gear train shell (500);

a driving wheel (602) integrated with the first end of the input shaft (2000);

a driving wheel (603) that is rotated by the driving wheel (602) in a direction opposite to that of the driving wheel (602);

a driving wheel (616) integrated with a revolving shaft (604) rotatably mounted to the gear train shell (500) and connected with the driving wheel (603) through the one-way transmission (305);

a driving wheel (615) integrated with the output shaft (3000) and coupled to the driving wheel (616) by a driving gear (617) integrated with a shaft (618) rotatably mounted to the gear train shell (500) to drive the driving wheel (615) in a same direction as the driving wheel (616), and wherein:

the driving gears (602, 603, 615, 616, and 617) are constituted by gears or friction wheels, the first transmission gear train includes the input shaft (2000) driven by the first direction rotary input and the first one-way transmission (301) for driving the output shaft (3000) to provide the first direction rotary output, and the second transmission gear train including the input shaft (2000) driven by the second direction rotary input, the driving wheel (602) driven by the input shaft (2000), the driving wheel (603) driven by the driving wheel (602), the driving wheel (616) driven by the driving wheel (603) through the one-way transmission (305) and the shaft (604), the driving wheel (617) driven by the driving wheel (616), and the driving wheel (615) driven by the driving gear (617) to rotate the output shaft (3000) and provide said first direction rotary output.

8. A bicycle having a transmission with a bidirectional input and a one-way output as claimed in claim 4, wherein the components of the transmission (13) include:

an input shaft (2000), a first end of which extends through and is rotatably mounted to a first side of the gear train shell (500) and a second end of which is rotatably mounted to a second side of the gear train shell (500);

an output shaft 3000 rotatably mounted to said sides of the gear train shell (500) and has at least one end that extend through the gear train shell (500) for providing said first direction rotary output, a driving wheel (602) integrated with the first end of the input shaft (2000);

a driving wheel (603) that is rotated by the driving wheel (602) in a direction opposite to that of the driving wheel (602);

a driving wheel (606) integrated with the output shaft (3000) and connected with the driving wheel (603) through the one-way transmission (305);

a driving wheel (605) connected to the input shaft (2000) via said first one-way transmission (301) and coupled to the driving wheel (606) by a pulley and driving belt (607) or sprocket and chain (607) to cause the driving wheel (605) to drive the driving wheel (606) and the output shaft (3000) in a same direction as the driving wheel (606), and wherein:

the driving gears (602, 603, 605, 606) are constituted by gears or friction wheels, the first transmission gear train includes the input shaft (2000) driven by the first direction rotary input, the driving wheel (605) driven by the input shaft (2000) through the first one-way transmission (301), the pulley or chain (607) driven by the driving wheel (605), and the driving wheel (606) driven by the pulley or chain (607) for driving the output shaft (3000) to provide the first direction rotary output, and the second transmission gear train including the input shaft (2000) driven by the second direction rotary input, the driving wheel (602) driven by the input shaft (2000), and the driving wheel (603) driven by the driving wheel (602) for rotating the output shaft (3000) to provide the first direction rotary output via the second one-way transmission (305).

9. A bicycle having a transmission with a bidirectional input and a one-way output as claimed in claim 4, wherein the components of the transmission (13) include:

an input shaft (2000), a first end of which extends through and is rotatably mounted to a first side of the gear train shell (500) and a second end of which is rotatably mounted to a second side of the gear train shell (500);

an output shaft 3000 rotatably mounted to said sides of the gear train shell (500) and has at least one end that extend through the gear train shell (500) for providing said first direction rotary output, a driving wheel (602) integrated with the first end of the input shaft (2000);

a driving wheel (603) that is rotated by the driving wheel (602) in a direction opposite to that of the driving wheel (602);

a driving wheel (616) integrated with the output shaft (3000) and connected with the driving wheel (603) through the one-way transmission (305);

a driving wheel (615) connected to the input shaft (2000) via said first one-way transmission (301) and coupled to the driving wheel (616) by a driving wheel (617) integrated with a shaft (618) rotatably mounted to the gear train shell (500) to cause the driving wheel (615) to drive the driving wheel (616) and the output shaft (3000) in a same direction as the driving wheel (616), and wherein:

the driving gears (602, 603, 615, 616) are constituted by gears or friction wheels, the first transmission gear train includes the input shaft (2000) driven by the first direction rotary input, the driving wheel (615) driven by the input shaft (2000) through the first one-way transmission (301), the driving wheel (617) driven by the driving wheel (615), and the driving wheel (616) driven by the driving wheel (617) for driving the output shaft (3000) to provide the first direction rotary output, and the second transmission gear train including the input shaft (2000) driven by the second direction rotary input, the driving wheel (602) driven by the input shaft (2000), and the driving wheel (603) driven by the driving wheel (602) for rotating the output shaft (3000) via the second one-way transmission (305) to provide the first direction rotary output.

10. A bicycle having a transmission with a bidirectional input and a one-way output as claimed in claim 5, 6, 7, 8, or 9, wherein the output shaft (3000) is connected to a one-way input power source and the input shaft is connected to a two-way output device to provide a transmission combined with a crank hole and having a one-way input and a bidirectional output.

* * * * *